United States Patent [19]

Kamiyama et al.

[11] Patent Number: 4,806,025
[45] Date of Patent: Feb. 21, 1989

[54] HOLDING DEVICE FOR AUTOMATIC SELF-ALIGNING BALL METAL

[75] Inventors: Akira Kamiyama; Yoshimasa Kimura; Yukiteru Hosoya, all of Kiryu, Japan

[73] Assignee: Mitsuba Electric Manufacturing Co., Ltd., Gunma, Japan

[21] Appl. No.: 130,168

[22] Filed: Dec. 8, 1987

[30] Foreign Application Priority Data

Dec. 9, 1986 [JP] Japan ............. 61-189520[U]

[51] Int. Cl.⁴ .................... F16C 23/04; F16F 1/18; H02K 7/08
[52] U.S. Cl. ................... 384/202; 384/204; 310/90; 267/163
[58] Field of Search ............ 384/192, 202–212, 384/214, 215, 903; 310/90; 267/161–163

[56] References Cited

U.S. PATENT DOCUMENTS

| | | | |
|---|---|---|---|
| 3,483,888 | 12/1969 | Wurzel | 384/203 X |
| 3,624,434 | 11/1971 | Dafler et al. | 310/90 |
| 3,754,802 | 8/1973 | Keller | 384/203 |
| 3,770,990 | 11/1973 | Winkelmann | 384/204 |
| 4,014,596 | 3/1977 | Kazama | 384/207 |

FOREIGN PATENT DOCUMENTS 149745 12/1975 Japan.
54-111542 8/1979 Japan.

Primary Examiner—Stuart S. Levy
Assistant Examiner—Thomas R. Hannon
Attorney, Agent, or Firm—Parkhurst, Oliff & Berridge

[57] ABSTRACT

Automatic self-aligning ball metals rotatably mounted at both end parts of a rotor shaft in an electric motor are supported by holding devices. The holding device is designed in the form of a disc having a flange portion around the outer periphery thereof. It is formed with a plurality of pawls having different intensities of resilient force which extend in the radial direction from an area located in the proximity of the flange portion. The pawls having a higher intensity of resilient force and the pawls having a lower intensity of resilient force are alternately arranged in the peripheral direction of the holding device and the inner part of each of the pawls is bent at a certain inclination angle. The pawls having a lower intensity of resilient force are adapted to come in contact with the metal ball earlier than the pawls having a higher intensity of resilient force. Each of the pawls having a higher intensity of resilient force has a width wider than the pawls having a lower intensity of resilient force. The pawls having a higher intensity of resilient force may have a thickness more than the pawls having a lower intensity of resilient force on the assumption that they have the same width. Usually, two kinds of pawls which are alternately arranged are used. Three kinds of pawls may be employed.

5 Claims, 2 Drawing Sheets

HOLDING DEVICE FOR AUTOMATIC SELF-ALIGNING BALL METAL

BACKGROUND OF THE INVENTION

The present invention relates to a holding device usable for an automatic self-aligning ball metal of which the outer peripheral surface is spherical.

Generally, this kind of automatic self-aligning ball metal is held under the effect of resilient force by allowing a plurality of pawls formed on a metal holder (retaining plate) to come in pressure contact with the outer peripheral surface thereof. With respect to the conventional automatic self-aligning ball metal, it is known that slide torque required for the purpose of self-aligning of the ball metal increases correspondingly as resilient force of the pawls increases. Accordingly, it is preferable that the resilient force of the pawls be reduced in order to assure that automatic self-aligning is effected smoothly. However, when the resilient force of the pawls is reduced, they cannot satisfactorily oppose a load exerted on the ball metal in the radial direction or in the axial direction, resulting in a reliable supporting function being maintained only with much difficulty. Thus, it is preferable that the resilient force of the metal holder be kept at a lower level in order to have a reduced slide torque, while it is preferable that it be kept at a higher level in order to satisfactorily oppose a load exerted on the ball metal. Accordingly, the resilient force of the metal holder is required to have two contradictory characteristics. However, since the conventional metal holder is so constructed that each of the pawls has the same resilient force, it cannot have the aforesaid contradictory characteristics. In view of the fact as mentioned above, the existent state relative to the metal holder is such that reliable supporting of a shaft is taken into first consideration and a function of smooth self-aligning is sacrificed to some extent. Consequently, slide torque required for the ball metal is increased and thereby self-aligning cannot be achieved smoothly. Another drawback is that when the metal holder is so fitted that the pawls have a predetermined resilient force, it has a narrow range of adjustment and fitting is satisfactorily achieved only with much difficulty.

SUMMARY OF THE INVENTION

The present invention has been made with the foregoing background in mind and its object resides in providing a holding device for an automatic self-aligning ball metal which is entirely free from the above-mentioned drawbacks. To accomplish the above object, the present invention provides a holding device for an automatic self-aligning ball metal of which the outer peripheral surface is spherical, the ball metal being adapted to be held by means of a metal holder, wherein the metal holder is formed with at least two kinds of pawls having a different intensity of resilient force. The pawls having a lower intensity of resilient force come into contact with the outer peripheral surface of the ball metal earlier than those having a higher intensity of resilient force in order to resiliently hold the ball metal.

The pawls extend in the radial direction inwardly of an area located in the proximity of the outer periphery thereof.

The pawls having a lower intensity of resilient force and the pawls having a higher intensity of resilient force are alternately arranged in the peripheral direction of the metal holder.

Usually, the pawls having a higher intensity of resilient force have a width wider than those having a lower intensity of resilient force.

Alternatively, the pawls having a higher intensity of resilient force may have a thickness more than those having a lower intensity of resilient force on the assumption that they have the same width.

Since the holding device of the invention is constructed in the above-described manner, a resilient holding force exerted on the ball metal by the metal holder functions weakly at the time of automatic self-aligning but it functions intensely when a load is applied to the ball metal in the axial direction.

These and other objects, features and advantages of the present invention will become readily apparent from a reading of the following description which has been made in conjunction with the accompanying drawings.

BRIEF DESCRIPTION OF THE DRAWINGS

The present invention will be illustrated in the following drawings.

DESCRIPTION OF THE PREFERRED EMBODIMENT

The present invention will be described in a greater detail hereinafter with reference to the accompanying drawings which illustrate a preferred embodiment thereof.

Figure 1:
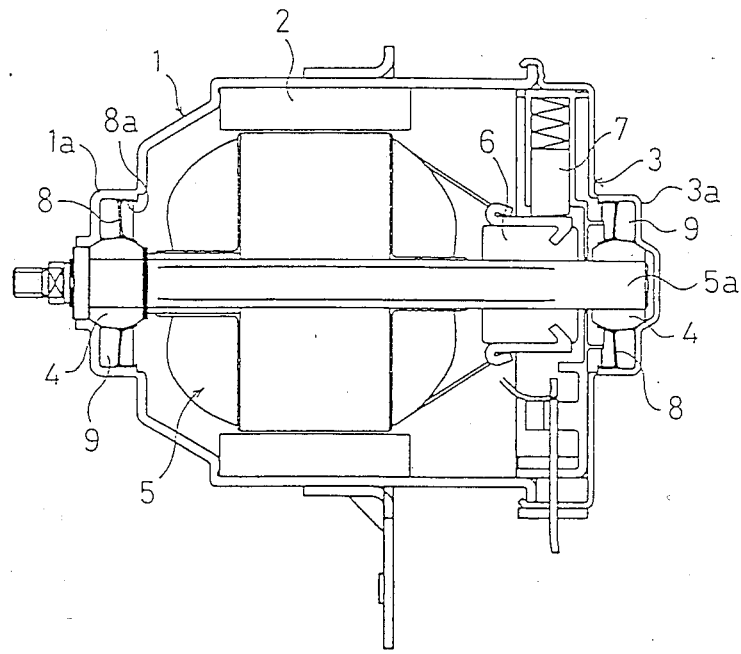
FIG. 1 is a vertical sectional view of an electric motor in which a holding device for automatic self-aligning of ball metals in accordance with an embodiment of the invention is incorporated.

In the drawings, reference numeral 1 designates a yoke constituting a case of an electric motor. A permanent magnet 2 is integrally secured to the inner surface of the yoke 1. A pair of ball metals 4 are rotatably accommodated in the interior of the cylindrical cavities 1a and 3a which are formed at the central part of the left end of the yoke 1 and the central part of the right end of an end bracket 3 as seen in FIG. 1. Both the end parts of a rotor shaft 5a for a rotor 5 are rotatably supported in the ball metals 4. Reference numeral 6 designates a commutator fixedly mounted on the rotor shaft 5a and reference numeral 7 designates a brush adapted to come in slidable contact with the commutator 6.

Each of the ball metals 4 has an outer spherical surface of which an outer side part is supported while coming in slidable contact with the spherical inner surface of the cylindrical cavity 1a of the yoke 1 or the cyindrical cavity 3a of the end bracket 3. On the other hand, the inner side part of the spherical surface of the ball metals 4 is supported while coming in slidable contact with a plurality of pawls of a metal holder 8 which will be described later. Thus, the ball metals 4 are accommodated in the interior of the electric motor in such a manner that they are automatically self-aligned.

Figure 2A:
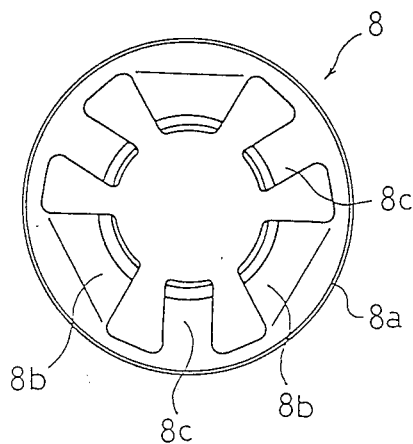
FIG. 2A is a front view of a metal holder constituting the holding device of the invention.
Figure 2B:
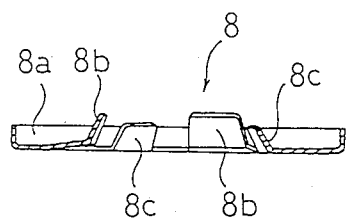
FIG. 2B is a sectional side view of the metal holder in FIG. 2A.
Figure 3:
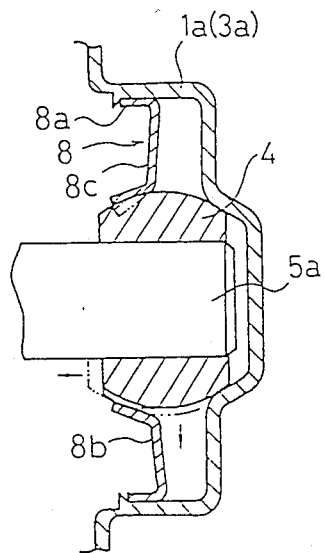
FIG. 3 is a fragmented enlarged vertical sectional view of the electric motor, particularly illustrating a function of the holding device.

As is apparent from FIGS. 2A and 2B, the metal holder 8 is designed in a disc-shaped configuration and it is fixedly kept in the interior of the cavities 1a and 3a by press fitting its flange portion 8a extending around the outer periphery thereof into the inner wall of the cavities 1a and 3a. As is best seen in FIG. 2, the metal holder 8 is formed with first pawls 8b and second pawls 8c of which the width is alternately different and which extend radially inwardly of the flange portion 8a. The first pawls 8b having a higher intensity of resilient force due to their wide width and the second pawls 8c having a lower intensity of resilient force due to their narrow width are bent in such a manner that the first pawls 8b are bent more inwardly than the second pawls 8c. That is, the former are bent toward the inner side of the rotor shaft 5a much more than the latter. Accordingly, when the metal holders 8 are tightly fitted into the cavities 1a and 3a, the second pawls 8c are brought into pressure contact with the outer peripheral surface of the ball metals 4 earlier than the first pawls 8b, while the first pawls 8b are kept slightly away from the outer peripheral surface of the ball metals 4 or they come in contact therewith with little force exerted thereon. Reference numeral 9 designates a felt in which a lubricant oil is impreganted.

Since both the end parts of the rotor shaft 5a are rotatably supported by means of the automatic self-aligning ball metals 4 with the aid of the holding device of the invention, the ball metals 4 are caused to automatically align themselves with one another, even when the rotor 5 is kept in an eccentric state due to error developed during fitting, shock or vibration after completion of the fitting or the like. Thus, the rotor 5 can rotate smoothly at all times.

As is readily apparent from the above decription, the present invention comprises the automatic self-alignable metal holders 8 as constructed in the above-described manner, and resilient force exerted on the ball metals 4 by the pawls of the metal holder 8 is normally derived from the second pawls 8c having a lower intensity of resilient force adapted to come in contact with the ball metals 4 earlier than the first pawls 8b. Consequently, the ball metals 4 are automatically self-aligned with low slide torque corresponding to a lower intensity of resilient force of the second pawls 8c whereby very smooth self-aligning is achieved.

On the other hand, when a load is exerted on the metal holders 8 in the radial direction or in the the axial direction due to vibration, shock or the like during rotation of the motor and it thereby cannot be supported by the second pawls 8c, the latter are bent much more with the result that the first pawls 8b having a higher intensity of resilient force are brought in pressure contact with the outer peripheral surface of the ball metals 4 and thereby the latter are intensively retained under the effect of resilient force of the first and second pawls 8b and 8c, causing the ball metals 4 to be held reliably. Thus, a malfunction such as unstable supporting of the rotor shaft 5a or the like can be avoided reliably.

Figure 4:
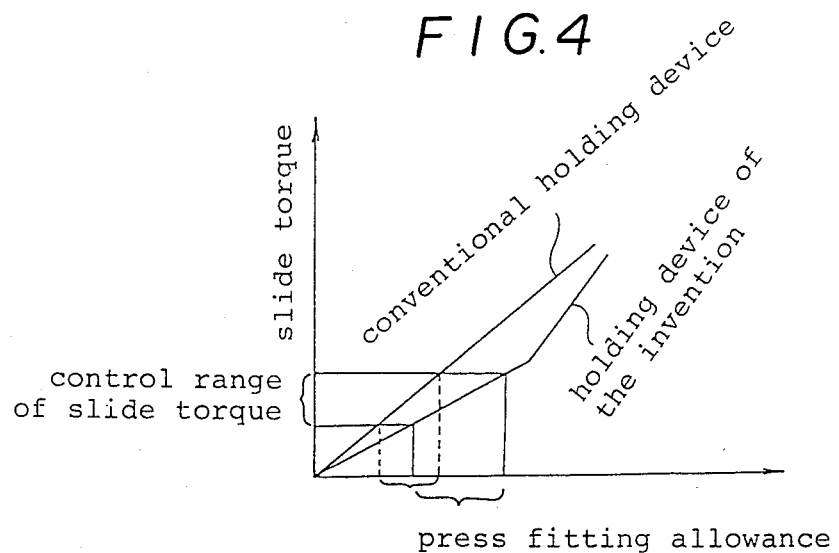
FIG. 4 is a graph illustrating a relation between press fit allowance and slide torque.

Further, since the metal holder 8 is so constructed that the second pawls 8c are brought in contact with the ball metals 4 earlier than the first pawls 8b when it is fitted, an adjustment range (press fit allowance) at the time of fitting can be more widely selected in association with slide torque than the conventional holding device, as will be readily apparent from FIG. 4. Accordingly, an operational efficiency of fitting operation can be improved substantially and moreover a reliability can be increased remarkably.

It should of course be understood that the present invention should not be limited only to the above-described embodiment. Provision of a difference between the resilient force between the first and second pawls should not be achieved only by variation of a width of the pawls. It may be achieved by variation of a thickness of the pawls. In order that the pawls having a lower intensity of resilient force come in contact with the ball metals earlier than those having a higher intensity of resilient force, a length of the pawls having a lower intensity of resilient force may be longer than those having a higher intensity of resilient force. Further, in order that the pawls of the metal holder have a different resilient force, the metal holder should not be limited only to the fact that they comprise two kinds of pawls. Alternatively, the metal holder may be formed with three or more kinds of pawls, as required.

Since the holding device of the invention is constructed in the above-described manner, the automatic self-aligning ball metals are normally retained by a plurality of pawls having a lower intensity of resilient force which are adapted to come in contact therewith earlier than those having a higher intensity of resilient force and thereby slide torque required for the ball metal can be reduced, resulting in automatic self-aligning being effected very smoothly. When a load is exerted on the ball metals in the axial direction or in the radial direction but the pawls having a lower intensity of resilient force cannot oppose it, it follows that the pawls having a higher intensity of resilient force are additionally brought into contact with the ball metals and thereby each of the ball metals can be held firmly. Consequently, firm holding of the ball metals is achieved without any hindrance, although they are adapted to be automatically self-aligned with reduced slide torque. This means that ideal holding of the ball metals can be achieved. Moreover, it suffices that fitting of the metal holder is effected in such a manner that the pawls having a lower intensity of resilient force come in contact with the ball metal earlier than those having a higher intensity of resilient force. Accordingly, the range of adjustment at the time of fitting can be determined wore widely than the conventional holding device. Thus, an operational efficiency at the time of fitting can be improved substantially and a reliability can be increased remarkably.

What is claimed is:

1. A holding device for an automatic self-aligning ball metal of which the outer peripheral surface is spherical, said ball metal being adapted to be held by means of a metal holder, wherein said metal holder is formed with at least two kinds of pawls having a different intensity of resilient force, the pawls having a lower intensity of resilient force coming into contact with the outer peripheral surface of the ball metal under light load and those having a higher intensity of resilient force coming into contact with the outer peripheral surface of the ball metal only under heavy load, in order to resiliently hold the ball metal regardless of load.

2. The holding device of claim 1, wherein the metal holder is produced in the form of a disc having a flange portion around the outer periphery thereof and each of the pawls extends in the radial direction inwardly of an area located in the proximity of said flange portion.

3. The holding device of claim 1, wherein the inner parts of the pawls are bent in such a manner that the pawls having a lower intensity of resilient force come in contact with the ball metal under light load whereas those having a higher intensity of resilient force come into contact with the ball metal only under heavy load.

4. The holding device of claim 1, wherein the pawls are alternately arranged in the peripheral direction of the holding device.

5. The holding device of claim 1, wherein the pawls having a higher intensity of resilient force have a width wider than the pawls having a lower intensity of resilient force when both the pawls have the same length.

* * * * *